US010838459B2

(12) United States Patent
Lanman et al.

(10) Patent No.: US 10,838,459 B2
(45) Date of Patent: *Nov. 17, 2020

(54) HYBRID OPTICS FOR NEAR-EYE DISPLAYS

(71) Applicant: Nvidia Corporation, Santa Clara, CA (US)

(72) Inventors: Douglas Lanman, Sunnyvale, CA (US); David Luebke, Charlottesville, VA (US)

(73) Assignee: NVIDIA CORPORATION, Santa Clara, CA (US)

(*) Notice: Subject to any disclaimer, the term of this patent is extended or adjusted under 35 U.S.C. 154(b) by 81 days.

This patent is subject to a terminal disclaimer.

(21) Appl. No.: 15/427,895

(22) Filed: Feb. 8, 2017

(65) Prior Publication Data

US 2017/0147034 A1 May 25, 2017

Related U.S. Application Data

(63) Continuation of application No. 14/145,733, filed on Dec. 31, 2013, now Pat. No. 9,880,325.

(Continued)

(51) Int. Cl.
G02B 27/10 (2006.01)
G06F 1/16 (2006.01)
(Continued)

(52) U.S. Cl.
CPC .......... *G06F 1/163* (2013.01); *G02B 3/0006* (2013.01); *G02B 3/0037* (2013.01);
(Continued)

(58) Field of Classification Search
CPC ...................................... G06F 1/163
(Continued)

(56) References Cited

U.S. PATENT DOCUMENTS 5,966,242 A 10/1999 Yamanaka
6,061,179 A 5/2000 Inoguchi et al.
(Continued)

FOREIGN PATENT DOCUMENTS

CN 1653374 A 8/2005
CN 101184166 A 5/2008
(Continued)

OTHER PUBLICATIONS

Lanman, et al.; Near-Eye Light Field Displays; ACM SIGGRAPH 2013 Emerging Technologies; Jul. 2013.
(Continued)

*Primary Examiner* — James C. Jones
(74) *Attorney, Agent, or Firm* — Zilka-Kotab, P.C.

(57) ABSTRACT

A method for displaying a near-eye light field display (NELD) image is disclosed. The method comprises determining a pre-filtered image to be displayed, wherein the pre-filtered image corresponds to a target image. It further comprises displaying the pre-filtered image on a display. Subsequently, it comprises producing a near-eye light field after the pre-filtered image travels through a microlens array adjacent to the display, wherein the near-eye light field is operable to simulate a light field corresponding to the target image. Finally, it comprises altering the near-eye light field using at least one converging lens, wherein the altering allows a user to focus on the target image at an increased depth of field at an increased distance from an eye of the user and wherein the altering increases spatial resolution of said target image.

9 Claims, 10 Drawing Sheets

Related U.S. Application Data

(60) Provisional application No. 61/865,784, filed on Aug. 14, 2013.

(51) Int. Cl.

| | | |
|---|---|---|
| *G02B 27/00* | (2006.01) | |
| *G02B 27/01* | (2006.01) | |
| *G02B 30/27* | (2020.01) | |
| *G02B 3/00* | (2006.01) | |
| *G09G 3/00* | (2006.01) | |

(52) U.S. Cl.
CPC ..... *G02B 27/0075* (2013.01); *G02B 27/0172* (2013.01); *G02B 30/27* (2020.01); *G09G 3/003* (2013.01); *G02B 2027/011* (2013.01); *G02B 2027/014* (2013.01); *G02B 2027/015* (2013.01); *G02B 2027/0118* (2013.01); *G02B 2027/0127* (2013.01)

(58) Field of Classification Search
USPC ........................................ 359/622
See application file for complete search history.

(56) References Cited

U.S. PATENT DOCUMENTS

| | | | |
|---|---|---|---|
| 6,215,593 | B1 | 4/2001 | Bruce |
| 6,381,072 | B1 | 4/2002 | Burger |
| 8,259,165 | B2 | 9/2012 | Schwerdtner |
| 8,482,859 | B2 | 7/2013 | Border et al. |
| 8,488,246 | B2 | 7/2013 | Border et al. |
| 9,182,596 | B2 | 11/2015 | Border et al. |
| 9,213,163 | B2 | 12/2015 | Lewis et al. |
| 9,244,280 | B1 | 1/2016 | Tiana et al. |
| 9,341,843 | B2 | 5/2016 | Border et al. |
| 9,494,797 | B2 | 11/2016 | Luebke et al. |
| 9,507,066 | B2 | 11/2016 | Kollin et al. |
| 9,557,565 | B2 | 1/2017 | Luebke et al. |
| 9,841,537 | B2 | 12/2017 | Luebke et al. |
| 9,880,325 | B2 * | 1/2018 | Lanman ............ G02B 27/0075 |
| 10,008,043 | B2 | 6/2018 | Luebke et al. |
| 10,395,432 | B2 | 8/2019 | Luebke et al. |
| 10,642,311 | B2 | 5/2020 | Lanman et al. |
| 2001/0010508 | A1 | 8/2001 | Kakeya |
| 2002/0089467 | A1 | 7/2002 | Hara |
| 2002/0114078 | A1 | 8/2002 | Halle et al. |
| 2003/0025849 | A1 | 2/2003 | Hara |
| 2004/0208394 | A1 | 10/2004 | Kurata |
| 2006/0170616 | A1 | 8/2006 | Hirayama et al. |
| 2007/0002274 | A1 | 1/2007 | Somani et al. |
| 2008/0049152 | A1 | 2/2008 | Hong et al. |
| 2008/0211995 | A1 | 9/2008 | Jeon et al. |
| 2008/0239499 | A1 | 10/2008 | Fukuda |
| 2009/0244682 | A1 | 10/2009 | Saishu et al. |
| 2010/0033813 | A1 | 2/2010 | Rogoff |
| 2010/0277803 | A1 | 11/2010 | Pockett et al. |
| 2011/0157667 | A1 | 6/2011 | Lacoste et al. |
| 2011/0164047 | A1 | 7/2011 | Pance |
| 2011/0214082 | A1 | 9/2011 | Osterhout et al. |
| 2012/0068913 | A1 | 3/2012 | Bar-Zeev et al. |
| 2012/0086624 | A1 | 4/2012 | Thompson et al. |
| 2012/0092514 | A1 | 4/2012 | Vandame |
| 2012/0120498 | A1 | 5/2012 | Harrison et al. |
| 2012/0206323 | A1 | 8/2012 | Osterhout et al. |
| 2013/0021226 | A1 | 1/2013 | Bell |
| 2013/0106674 | A1 | 5/2013 | Wheeler et al. |
| 2013/0176386 | A1 | 7/2013 | Midavaine |
| 2013/0242402 | A1 | 9/2013 | Konig |
| 2013/0285885 | A1 | 10/2013 | Nowatzyk et al. |
| 2014/0043320 | A1 | 2/2014 | Tosaya et al. |
| 2014/0118829 | A1* | 5/2014 | Ma ...................... G02B 5/1885 359/567 |
| 2014/0168034 | A1 | 6/2014 | Luebke et al. |
| 2014/0168035 | A1 | 6/2014 | Luebke et al. |
| 2014/0168783 | A1 | 6/2014 | Luebke et al. |
| 2015/0049390 | A1 | 2/2015 | Lanman et al. |
| 2017/0061698 | A1 | 3/2017 | Luebke et al. |
| 2018/0190038 | A1 | 7/2018 | Luebke et al. |
| 2019/0101954 | A1 | 4/2019 | Lanman et al. |

FOREIGN PATENT DOCUMENTS

| | | |
|---|---|---|
| CN | 102445755 A | 5/2012 |
| DE | 69216391 T2 | 4/1997 |
| DE | 102006049404 A1 | 4/2008 |
| DE | 102008020858 A1 | 11/2009 |
| DE | 102008039987 A1 | 3/2010 |
| DE | 102008042397 A1 | 4/2010 |
| EP | 3104215 | 12/2016 |
| JP | 3444577 | 9/2003 |
| TW | 201219829 A | 5/2012 |
| TW | 201228380 A | 7/2012 |
| WO | 2011156721 A1 | 12/2011 |
| WO | 2012034963 A1 | 3/2012 |
| WO | 2012062681 A1 | 5/2012 |
| WO | WO2016011367 | 1/2016 |
| WO | WO2016064773 | 4/2016 |
| WO | WO2016122571 | 8/2016 |
| WO | WO2016198735 | 12/2016 |

OTHER PUBLICATIONS

Pamplona, et al.; "Tailored Displays to Compensate for Visual Aberrations"; SIGGGRAPH 2012.
Lanman et al., U.S. Appl. No. 14/145,733, filed Dec. 31, 2013.
Restriction Requirement from U.S. Appl. No. 14/145,733, dated Jun. 4, 2015.
Restriction Requirement from U.S. Appl. No. 14/145,733, dated Dec. 1, 2015.
Non-Final Office Action from U.S. Appl. No. 14/145,733, dated May 18, 2016.
Non-Final Office Action from U.S. Appl. No. 14/145,733, dated Dec. 2, 2016.
Notice of Allowance from U.S. Appl. No. 14/145,733, dated Jun. 1, 2017.
Notice of Allowance from U.S. Appl. No. 14/145,733, dated Sep. 19, 2017.
Lanman et al., "Near-Eye Light Field Displays," ACM Transactions on Graphics (TOG), vol. 32, Issue. 6, Proceedings of Siggraph Asia, Nov. 1, 2013, 10 pages, retrieved from https://research.nvidia.com/publication/near-eye-light-field-displays.
Lanman et al., U.S. Appl. No. 16/189,379, filed Nov. 13, 2018.
Non-Final Office Action from U.S. Appl. No. 16/189,379, dated Mar. 5, 2019.
Final Office Action from U.S. Appl. No. 16/189,379, dated Aug. 21, 2019.
Non-Final Office Action from U.S. Appl. No. 16/189,379, dated Dec. 12, 2019.
Non-Final Office Action from U.S. Appl. No. 13/720,831, dated Aug. 7, 2014.
Final Office Action from U.S. Appl. No. 13/720,831, dated May 18, 2015.
Notice of Allowance from U.S. Appl. No. 13/720,831, dated Dec. 16, 2015.
Notice of Allowance from U.S. Appl. No. 13/720,831, dated Mar. 25, 2016.
Notice of Allowance from U.S. Appl. No. 13/720,831, dated Jul. 14, 2016.
Alonso Jr. et al., "Pre-Compensation for High-Order Aberrations of the Human Eye Using On-Screen Image Deconvolution", Proceedings of the 25th Annual International Conference of the IEEE EMBS, Sep. 2003, pp. 556-559.
Non-Final Office Action from U.S. Appl. No. 15/351,297, dated Dec. 12, 2016.
Final Non-Final Office Action from U.S. Appl. No. 15/351,297, dated Sep. 20, 2017.
Notice of Allowance from U.S. Appl. No. 15/351,297, dated Feb. 21, 2018.

(56) References Cited

OTHER PUBLICATIONS

Supplemental Notice of Allowance from U.S. Appl. No. 15/351,297, dated May 30, 2018.
Pamplona et al., "Tailored Displays to Compensate for Visual Aberrations," ACM Transactions on Graphics, vol. 31, No. 4, Jul. 2012, pp. 81:1 - 81:12.
Luebke et al., U.S. Appl. No. 15/351,297, filed Nov. 14, 2016.
Luebke et al., U.S. Appl. No. 13/720,831, filed Dec. 19, 2012.
Luebke et al., U.S. Appl. No. 15/909,907, filed Mar. 1, 2018.
Non-Final Office Action from U.S. Appl. No. 15/909,907, dated Apr. 3, 2018.
Final Office Action from U.S. Appl. No. 15/909,907, dated Jan. 23, 2019.
Notice of Allowance from U.S. Appl. No. 15/909,907, dated Apr. 16, 2019.
Luebke et al., U.S. Appl. No. 13/720,809, filed Dec. 19, 2012.
Luebke et al., U.S. Appl. No. 13/720,842, filed Dec. 19, 2012.
Notice of Allowance from U.S. Appl. No. 16/189,379, dated Mar. 23, 2020.

\* cited by examiner

| Focal Length (mm) | Optical Power (diopters) | Perceived Resolution (pixels) |
|---|---|---|
| N/A (WELD) | N/A (WELD) | 698X393 |
| 100.0 | 10 | 798X449 |
| 50.0 | 20 | 891X501 |
| 33.3 | 30 | 979X551 |
| 25.0 | 40 | 1062X597 |
| 20.0 | 50 | 1140X641 |
| 16.6 | 60 | 1214X683 |

FIG. 6

Double-Convex HONED Lens System

Plano-Convex HONED Lens System

Single-Element HONED Optics

HYBRID OPTICS FOR NEAR-EYE DISPLAYS

CROSS-REFERENCE TO RELATED APPLICATIONS

The present application is a continuation of, claims the benefit of and priority to U.S. application Ser. No. 14/145,733, filed Dec. 31, 2013, entitled "HYBRID OPTICS FOR NEAR-EYE DISPLAYS", and hereby incorporated by reference in its entirety, which claims the benefit of and priority to U.S. Provisional Application No. 61/865,784, filed Aug. 14, 2013, the entire disclosure of which is incorporated herein by reference.

The following copending U.S. patent application are incorporated herein by reference for all purposes: U.S. patent application Ser. No. 13/720,809, "NEAR-EYE MICROLENS ARRAY DISPLAYS," David Luebke, filed Dec. 19, 2012; and U.S. patent application Ser. No. 13/720,831, "NEAR-EYE PARALLAX BARRIER DISPLAYS," David Luebke, filed Dec. 19, 2012; and U.S. patent application Ser. No. 13/720,842, "NEAR-EYE OPTICAL DECONVOLUTION DISPLAYS," David Luebke, filed Dec. 19, 2012.

BACKGROUND OF THE INVENTION

Near-eye displays (NEDs) include head-mounted displays (HMDs) that may project images directly into a viewer's eyes. Such displays may overcome the limited screen size afforded by other mobile display form factors by synthesizing virtual large-format display surfaces, or may be used for virtual or augmented reality applications.

Near-eye displays can be divided into two broad categories: immersive displays and see-through displays. The former may be employed in virtual reality (VR) environments to completely encompass a user's field of view with synthetically-rendered imagery. The latter may be employed in augmented reality (AR) applications, where text, other synthetic annotations, or images may be overlaid in a user's view of the physical environment. In terms of display technology, AR applications require semi-transparent displays (e.g., achieved by optical or electro-optical approaches), such that the physical world may be viewed simultaneously with the near-eye display.

Near-eye displays (NEDs) have proven difficult to construct due to the fact that the unaided human eye cannot accommodate (focus) on objects placed within close distances, for example, the distance between the lenses of reading glasses to a user's eye when the user is wearing the glasses. As a result, NED systems have conventionally required complex and bulky optical elements to allow the viewer to comfortably accommodate on the near-eye display, which would otherwise be out of focus.

A conventional solution is to place a beam-splitter (e.g., a partially-silvered mirror) directly in front of the viewer's eye. This allows a direct view of the physical scene, albeit with reduced brightness. In addition, a display (e.g., an LCD panel) is placed on the secondary optical path. Introducing a lens between the beam-splitter and the display may have the effect of synthesizing a semi-transparent display located within the physical environment. In practice, multiple optical elements are required to minimize aberrations and achieve a wide field of view for such a solution, leading to bulky and expensive eyewear that has prohibited widespread consumer adoption.

A conventional solution for VR applications is to place a magnifier in front of a microdisplay. For example, a single lens placed over a small LCD panel so that the viewer can both accommodate or focus on the display, despite the close distance, as well as magnify the display, so that it appears to be much larger and at a greater distance.

BRIEF SUMMARY OF THE INVENTION

Embodiments of the present invention provide near-eye displays, wherein a display is viewed through a light field generating element, e.g., a microlens array, placed in proximity to the display, and a converging lens placed adjacent to the light field generating element. In one embodiment, the microlens array and display act in concert to depict a light field for virtual objects located within a compressed depth of field. Accordingly, embodiments of the present invention provide a hybrid optics systems wherein a primary magnifier used in conventional head mounted displays (HMDs) is combined with a microlens array used in near-eye light field display (NELD) architectures. As compared with NELD architectures, the converging lens can reduce the depth of field that must be depicted with the light field display and translate it closer to the user's eye. As a result, embodiments of the invention preclude the need for additional costly or bulky optical elements to support comfortable accommodation for head mounted displays.

The converging lens placed in front of (e.g., towards the eye) the microlens array induces an artificial myopia (near-sightedness) in the viewer. Accordingly, the underlying near-eye light field display, which, in one embodiment, is a combination of the microlens array and a display, can be operated in a manner that preserves a greater percentage of the native display resolution. Embodiments of the present invention therefore improve the perceived spatial resolution for the user. By relaxing the requirement for high resolution displays, embodiments of the present invention can be incorporated into more practical form factors that can be produced at a lower cost than conventional head mounted displays.

In one embodiment, a method for displaying a near-eye light field display (NELD) image is disclosed. The method comprises determining a pre-filtered image to be displayed, wherein the pre-filtered image corresponds to a target image. It further comprises displaying the pre-filtered image on a display. Subsequently, it comprises producing a near-eye light field after the pre-filtered image travels through a microlens array disposed adjacent to the display, wherein the near-eye light field is operable to simulate a light field corresponding to the target image. Finally, it comprises altering the near-eye light field using at least one converging lens, wherein the altering allows a user to focus on said target image at an increased depth of field at an increased distance from an eye of the user and to increase spatial resolution of said target image.

In another embodiment, a system for displaying a NELD image is disclosed. The system comprises a display comprising a plurality of pixels and a computer system coupled with the display and operable to cause the display to render a target image. It further comprises a microlens array disposed adjacent to the display and comprising a plurality of microlenses, wherein the microlens array is operable to produce a light field corresponding to the target image by altering light emitted by the display, and wherein the display and the microlens array are disposed within a near-eye range of an observer. Also it comprises at least one converging lens disposed between the microlens array and an expected position of an eye of the observer, wherein the at least one converging lens is operable to further alter the light field emitted from the microlens array in order to allow a user to focus on said target image at an increased depth of field at an increased distance from an eye of the observer and to increase the spatial resolution of the target image.

In a different embodiment, an apparatus for displaying a NELD image is disclosed. The apparatus comprises a curved display comprising a plurality of pixels, operable to display a pre-filtered image corresponding to a target image. It also comprises a curved microlens array disposed adjacent to the display and comprising a plurality of microlenses, wherein the microlens array is operable to produce a light field corresponding to the target image by altering light emitted by the display, and wherein the display and the microlens array are disposed within a near-eye range of an observer. Finally, in one embodiment, it comprises at least one converging lens, wherein the at least one converging lens is operable to further alter the light field emitted from the microlens array before entering an eye of the observer in order to allow the observer to focus on said target image at an increased depth of field at an increased distance from an eye of the observer and to increase the spatial resolution of the target image.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 6 is a table comprising design examples for HONED architectures.

DETAILED DESCRIPTION OF THE INVENTION

Figure 1:
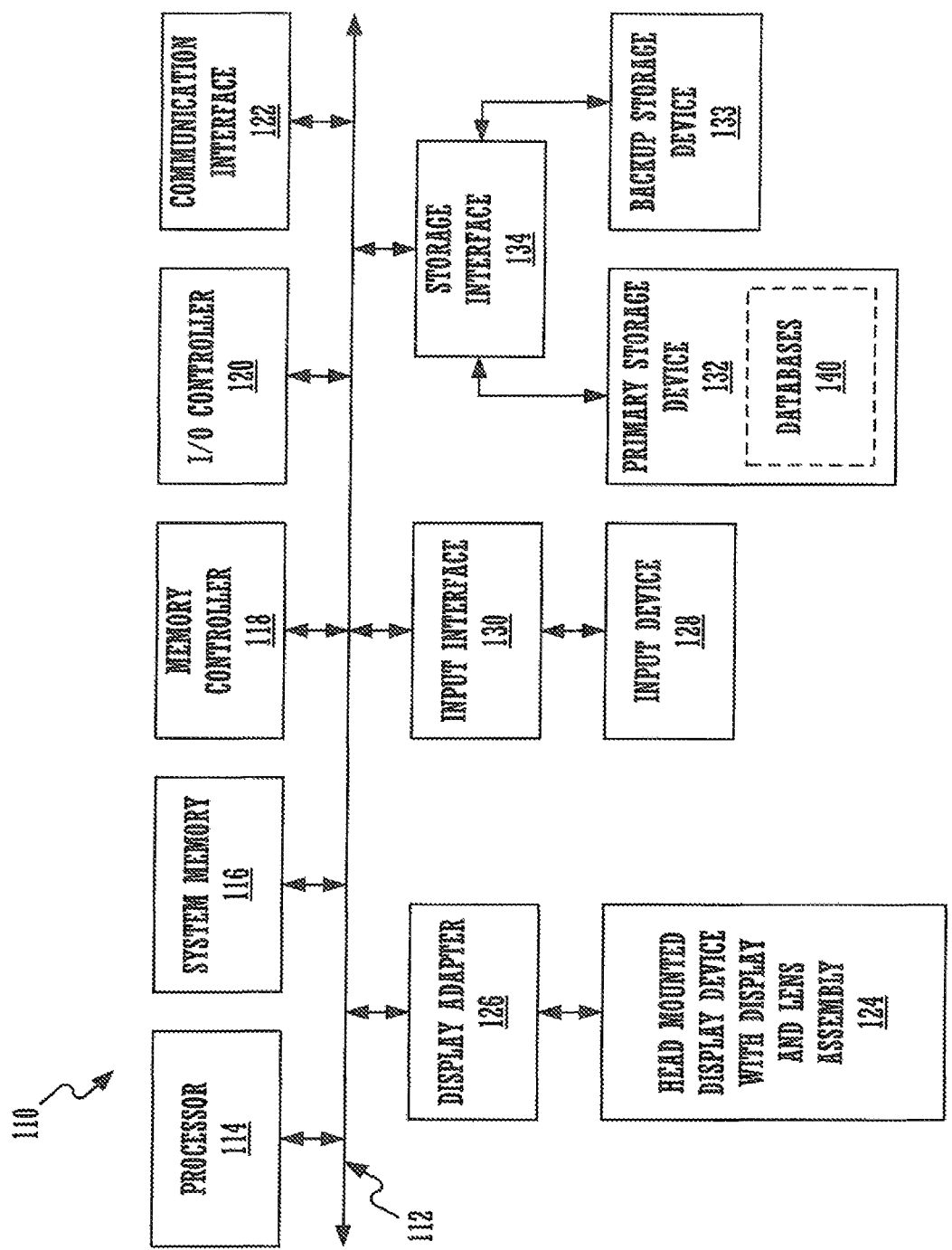
FIG. 1 is an exemplary computer system in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "determining," "displaying," "producing," "altering" or the like, refer to actions and processes (e.g., flowchart 1000 of FIG. 10) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, head mounted computer display systems, or any other computing system or device. In its most basic configuration, computing system 110 may include at least one processor 114 and a system memory 116.

Processor 114 generally represents any type or form of processing unit capable of processing data or interpreting and executing instructions. For example, processing unit 114 may represent a central processing unit (CPU), a graphics processing unit (GPU), or both. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. In one embodiment, display device 124 is a head mounted device comprising a display and lens assembly described further in connection with figures below, e.g., 2B-C, 3, 4, 7 and 8. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. If computing system 110 resides within a head-mounted display, then input device 128 may also include mechanisms for head, eye, or body tracking.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

Figure 2:
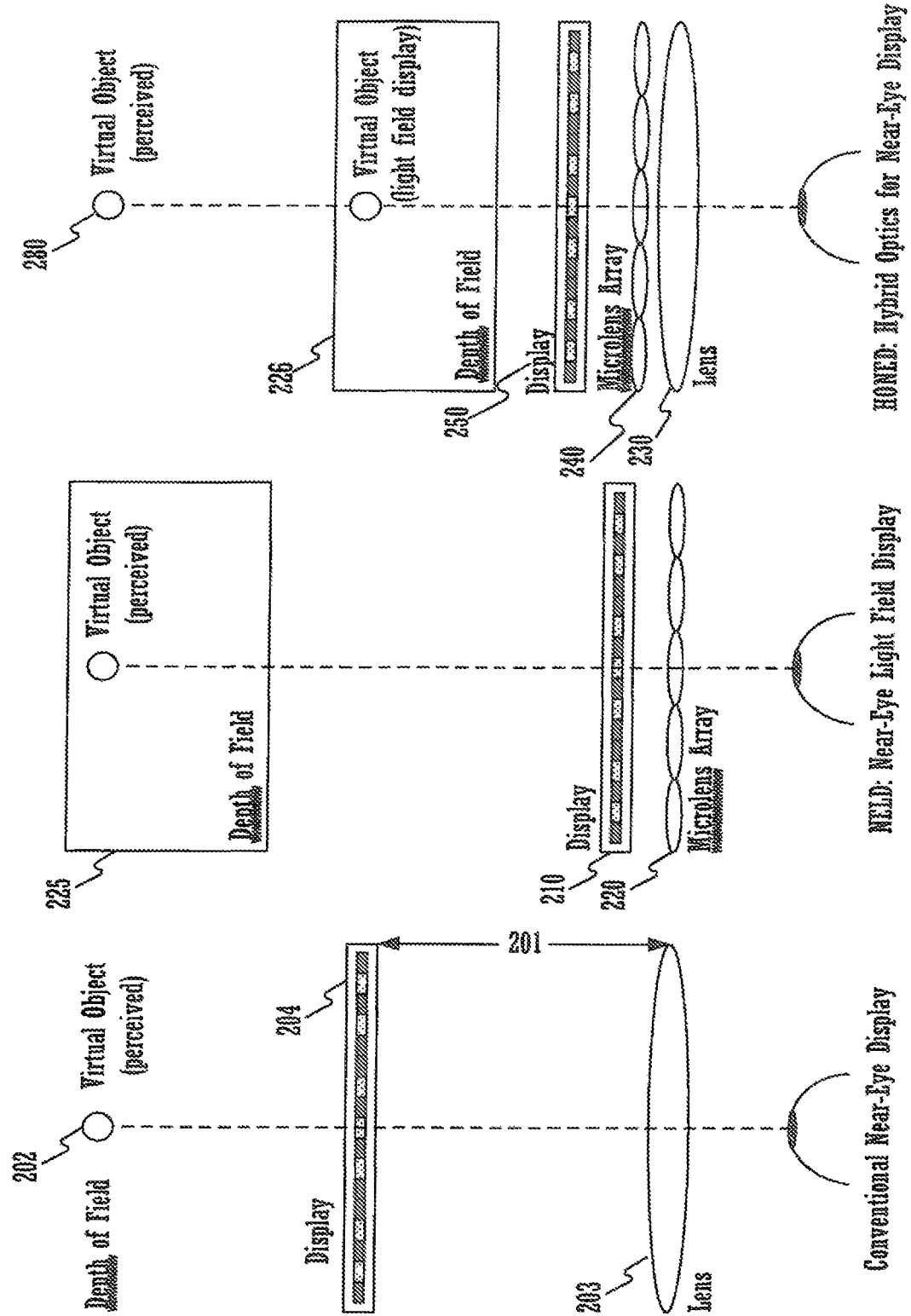
FIG. 2A illustrates a conventional near-eye display (NED) comprising a converging lens in front of a display.
FIG. 2B illustrates a near-eye light field display (NELD) system comprising a microlens array placed adjacent to a display.
FIG. 2C illustrates a hybrid optics for near-eye display (HONED) architecture wherein a converging lens is placed in front of a microlens array in accordance with embodiments of the present invention.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

For example, a computer program for determining a pre-filtered image based on a target image may be stored on the computer-readable medium and then stored in system memory 116 and/or various portions of storage devices 132 and 133. When executed by the processor 114, the computer program may cause the processor 114 to perform and/or be a means for performing the functions required for carrying out the determination of a pre-filtered image discussed above.

Hybrid Optics for Near-Eye Displays

Embodiments of the present invention provide near-eye displays, wherein a display is viewed through a light field generating element, e.g., a microlens array, placed in proximity to the display, and a converging lens placed adjacent to the microlens array. In one embodiment, the microlens array and display act in concert to depict a light field for virtual objects located within a compressed depth of field. Accordingly, embodiments of the present invention provide a hybrid optics systems wherein a primary magnifier used in conventional head mounted displays (HMDs) is combined with a microlens array used in near-eye light field display (NELD) architectures. As compared with NELD architectures, the converging lens can reduce the depth of field that must be depicted with the light field display. As a result, embodiments of the invention preclude the need for additional costly or bulky optical elements to support comfortable accommodation for head mounted displays.

The components, functions and processes that comprise an NELD architecture are described in detail in the following: U.S. patent application Ser. No. 13/720,809, "NEAR-EYE MICROLENS ARRAY DISPLAYS," David Luebke, filed Dec. 19, 2012; and U.S. patent application Ser. No. 13/720,831, "NEAR-EYE PARALLAX BARRIER DISPLAYS," David Luebke, filed Dec. 19, 2012; and U.S. patent application Ser. No. 13/720,842, "NEAR-EYE OPTICAL DECONVOLUTION DISPLAYS," David Luebke, filed Dec. 19, 2012 ("the NELD architecture applications"), all of which is incorporated herein by reference.

As stated above, embodiments of the present invention provide a hybrid optics system for the NELD architecture discussed in the NELD architecture applications by combining a converging lens in front of the microlens array. The converging lens placed in front of the microlens array induces an artificial myopia (nearsightedness) in the viewer. Accordingly, the underlying near-eye light field display, which is a combination of the microlens array and the display as discussed in the NELD architecture applications, can be operated in a manner that preserves a greater percentage of the native display resolution. While the discussion of the present invention uses a microlens array as an example of a light field generating element, it will be appreciated by one of ordinary skill that, as described in further detail in the NELD architecture applications, the light field generating element can be constructed in various different ways, e.g., stacks of displays etc.

The NELD architecture disclosed in the NELD architecture applications addresses long-standing challenges for virtual reality near-eye display architectures, enabling thin, lightweight magnifying optics, the ability to correct the user's optical aberrations (e.g., eliminating the need for prescription eyewear), and comfortable viewing by addressing accommodation convergence conflict and depicting approximately-correct retinal defocus blur. The NELD displays can, in one embodiment, synthesize sharp, wide-field-of-view imagery using out-of-focus optical elements. In one embodiment, a display is viewed through a microlens array placed in close proximity. Each microlens and display segment act as a conventional HMD magnifier, depicting a virtual, erect image at a comfortable focusing distance for the viewer. This architecture presents virtual objects with correct retinal focus and defocus cues, thereby, enhancing the user's perception of depth. Furthermore, since the microlens apertures are relatively small compared to conventional HMD magnifying optics, short focal lengths are achievable, enabling thin, lightweight HMDs. However, these benefits may come at a cost because the perceived spatial resolution is reduced relative to the native display resolution.

By placing a converging optical element in front of the microlens array of the NELD architecture, embodiments of the present invention enhance the perceived spatial resolution of the near-eye light field displays disclosed in the NELD architecture applications. Embodiments of the present invention significantly enhance the resolution in each dimension using magnifying optics. These benefits can be realized, for example, in one embodiment, by adding a single lens with a total thickness in front of the microlens array, wherein the converging lens can be placed in direct contact with or physically separated from the microlens array. Accordingly, the form factor benefits of the NELD designs can be maintained without sacrificing spatial resolution. Embodiments of the present invention, therefore, allow the NELD designs to be incorporated into more practical form factors because the need for exceedingly high resolution displays is relaxed. As a result, they advantageously reduce the cost for head-mounted displays as well.

FIG. 2A illustrates a conventional near-eye display (NED) comprising a converging lens 203 in front of a display 204. The user perceives a virtual, erect image 202 appearing to be located far away. Typically, the converging lens 203 is separated by its focal length 201 from the display 204 such that the virtual image appears at optical infinity.

FIG. 2B illustrates a near-eye light field display (NELD) system, as discussed in the NELD architecture applications, comprising a microlens array 220 placed adjacent to a display 210. Since the microlenses have relatively short focal lengths, as compared to lenses used in conventional NEDs, e.g., the NED illustrated in FIG. 2A, the HMD thickness can be significantly reduced. This design allows virtual objects to be depicted throughout an extended depth of field 225.

FIG. 2C illustrates a hybrid optics for near-eye display (HONED) architecture wherein a converging lens is placed in front of a microlens array in accordance with embodiments of the present invention. The HONED architecture of the present invention, in one embodiment, functions as a combination of conventional near-eye displays, e.g., the architecture shown in FIG. 2A, and a NELD design, e.g., the architecture shown in FIG. 2B. Specifically, a microlens 240 is placed adjacent to a converging lens 230. In one embodiment, the microlens array 240 and display 250 act in concert to depict a light field for virtual objects located within the compressed depth of field 226. It should be appreciated that, as compared with the exemplary NELD architecture depicted in FIG. 2B, the converging lens 230 of FIG. 2C dramatically reduces the depth of field that must be depicted with the light field display. In other words, it allows a depth of field located close to the display, e.g., depth of field 226 to be depicted by the microlens and the display. Since virtual objects, as depicted by the underlying NELD display, are located close to the display in the depth of field 226, greater resolution is preserved. The depth of field 226 is, however, transformed by the converging lens 230 so that the virtual object can be perceived at location 280 within the same depth of field 225 as the NELD architecture illustrated in FIG. 2B. Accordingly, the converging lens allows the viewer to comfortably focus on objects that appear within their natural accommodation range. The HONED architecture, therefore, allows a greater percentage of the native display resolution to be preserved, while maintaining the benefits of the NELD architecture and allowing a user to easily focus on the virtual image.

Figure 3:
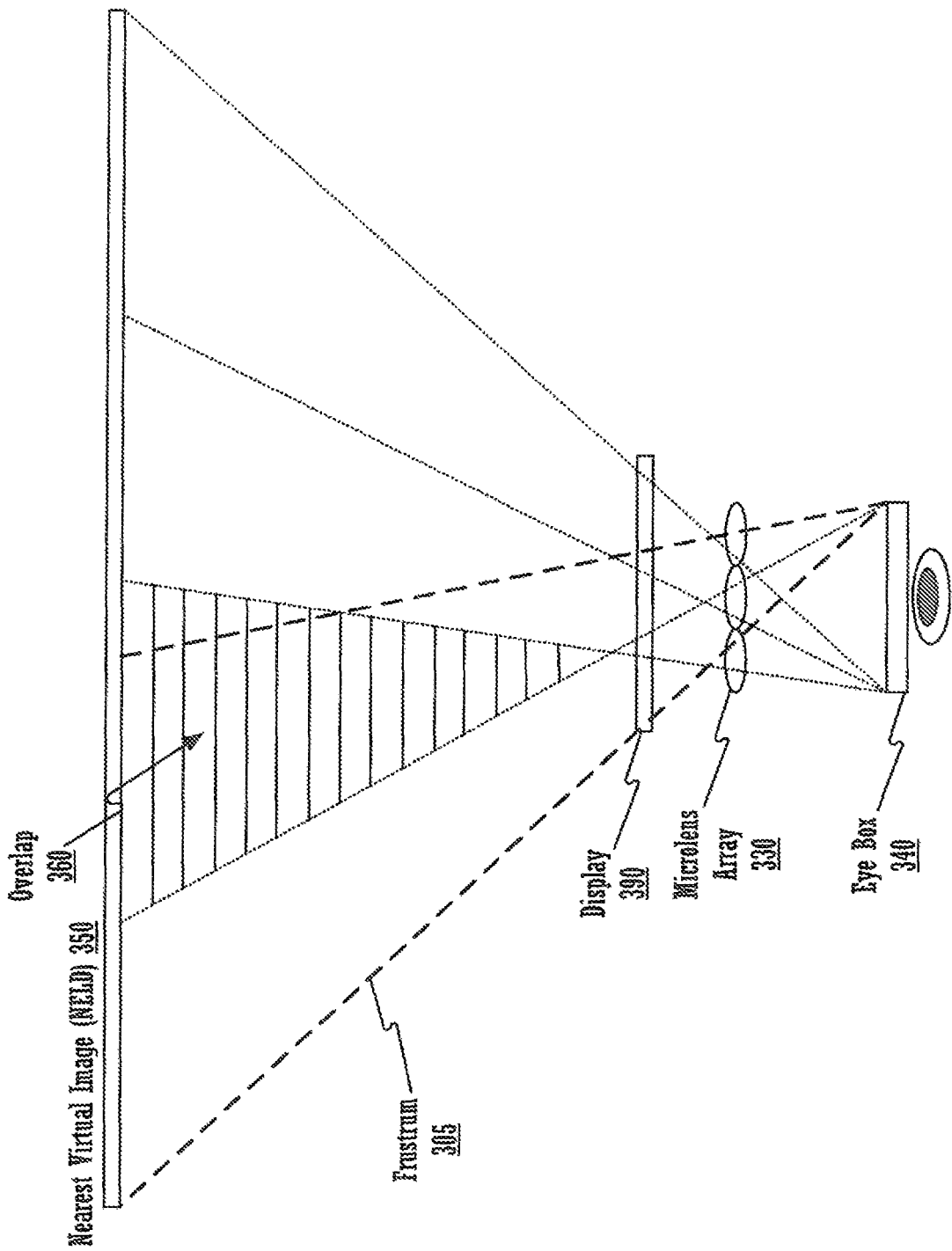
FIG. 3 illustrates the shortcomings of the NELD architecture.

FIG. 3 illustrates the shortcomings of the NELD architecture, an example of which is shown in FIG. 2B. As discussed above, the perceived spatial resolution in the NELD architecture is reduced relative to the native display resolution. As shown in FIG. 3, in NELD architectures, the center of each microlens in microlens array 330 and the eye box 340 defines a viewing frustum, e.g. frustrum 305. It should be noted that, in one embodiment, an eyebox is the physical region over which the pupil can move in front of the near-eye display (NED), such that the imagery is perceived without significant artifacts or distortions. This region is typically a 3-dimensional construct extending in length, width and height in front of the display. However, for purposes of the illustrations, it is shown as a 2-dimensional box at a fixed distance in front of the microlens array. This distance corresponds to the typical distance of a viewer's pupil, when the NED is worn as part of a head mounted apparatus or otherwise viewed.

Nearest virtual image 350 represents the nearest distance the unaided human eye can accommodate at. It should be appreciated that neighboring viewing frusta exhibit considerable overlap at this distance, e.g., overlap region 360. This leads to significant redundancy within the rendered light field for a virtual object located at this depth and, accordingly, the perceived spatial resolution is reduced as compared with the native display resolution. For example, any point on nearest virtual image 350 that falls within the overlap region 360 will result in being depicted on the display 390 more than once, thus, causing a loss of resolution.

Figure 4:
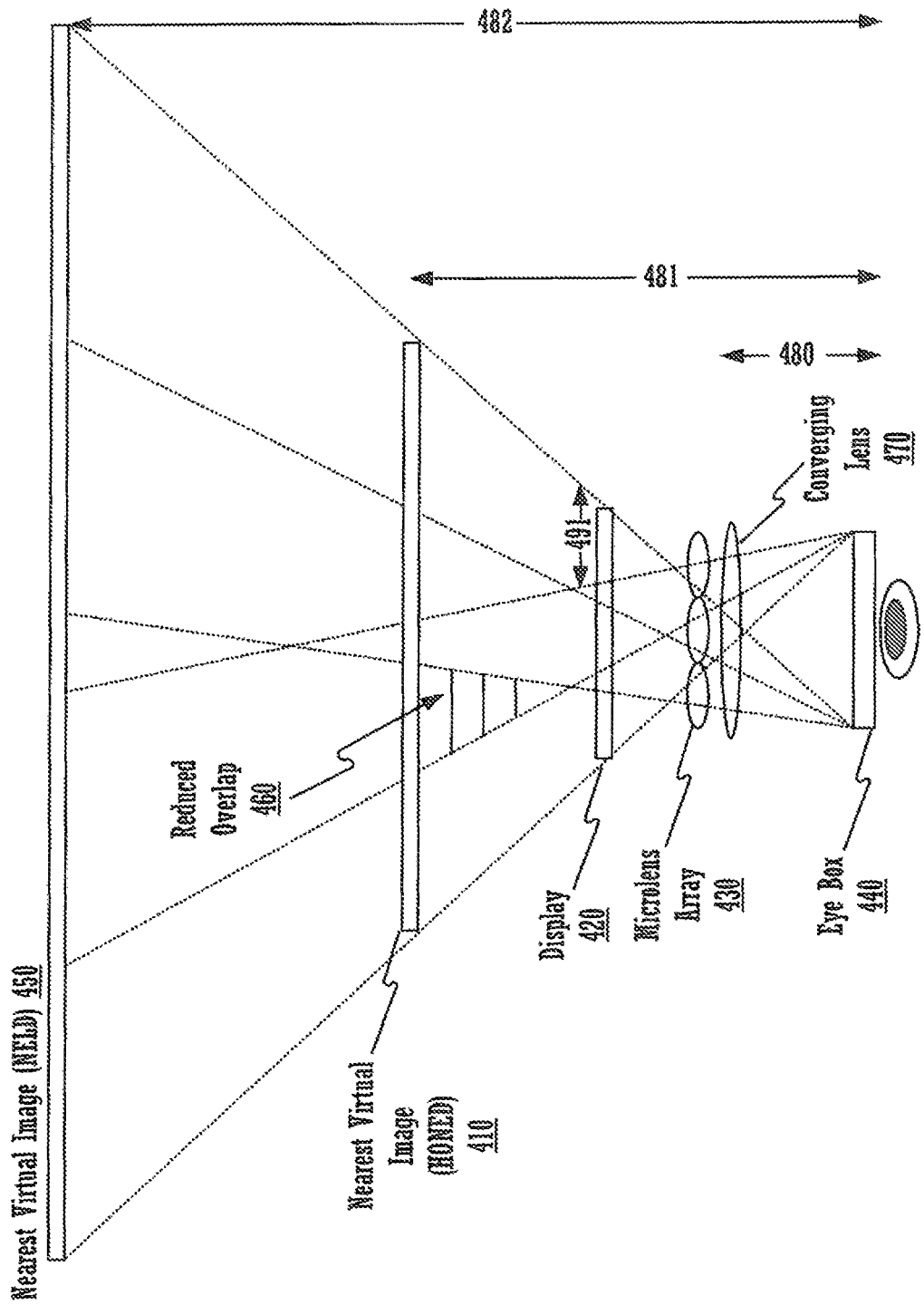
FIG. 4 illustrates the manner in which the hybrid optics for near-eye displays architecture increases perceived spatial resolution in accordance with embodiments of the present invention.

FIG. 4 illustrates the manner in which the hybrid optics for near-eye displays architecture increases perceived spatial resolution in accordance with embodiments of the present invention. Employing converging lens 470 in front of microlens array 430 reduces the depth of field that must be depicted with the light field display as discussed above. The microlens array 430 and display 420 create a first virtual image plane 410 at a reduced distance 481 as compared to the traditional NELD architecture, wherein the nearest virtual image plane 450 is created at distance 482 from the eyebox. The converging lens 470 transforms the light field display created by the microlens array and the display to allow an image to be perceived at second virtual image plane 450 at distance 482. Thus, while the light field display creates the nearest image plane 410 closer to display 420, the user still perceives the image at distance 482 because of the converging lens 470. Stated differently, while the microlens array 430 and display 420 act in concert to create a light field display that creates a virtual image 410 at distance 481, converging lens 470 alters the light field display so that the image is perceived at virtual image plane 450 at virtual image distance 482 by the user.

Thus, the HONED architecture has the effect of bringing the nearest virtual image plane (e.g. image plane 410) closer to microlens array 430. Accordingly, the nearest virtual image under the HONED architecture 410 is significantly closer to the microlens array 430 as compared to the nearest virtual image 450 under the NELD architecture. As seen in FIG. 4, the overlap, e.g., overlap region 460 between neighboring frusta is reduced as the nearest virtual image plane is brought closer to the microlens array 430.

Accordingly, HONED architectures are capable of accommodating at a much closer distance and effectively reduce the geometric overlap between neighboring viewing frusta by allowing closer NELD-depicted virtual image distances, e.g., at image plane 410. By reducing overlap, repetition is reduced, which in turn leads to increased perceived spatial resolution. It should be noted, however, that the user will continue to perceive the image at distance 482 because of converging lens 470, which alters the light field display created to increase the perceived virtual image distance.

Figure 5:
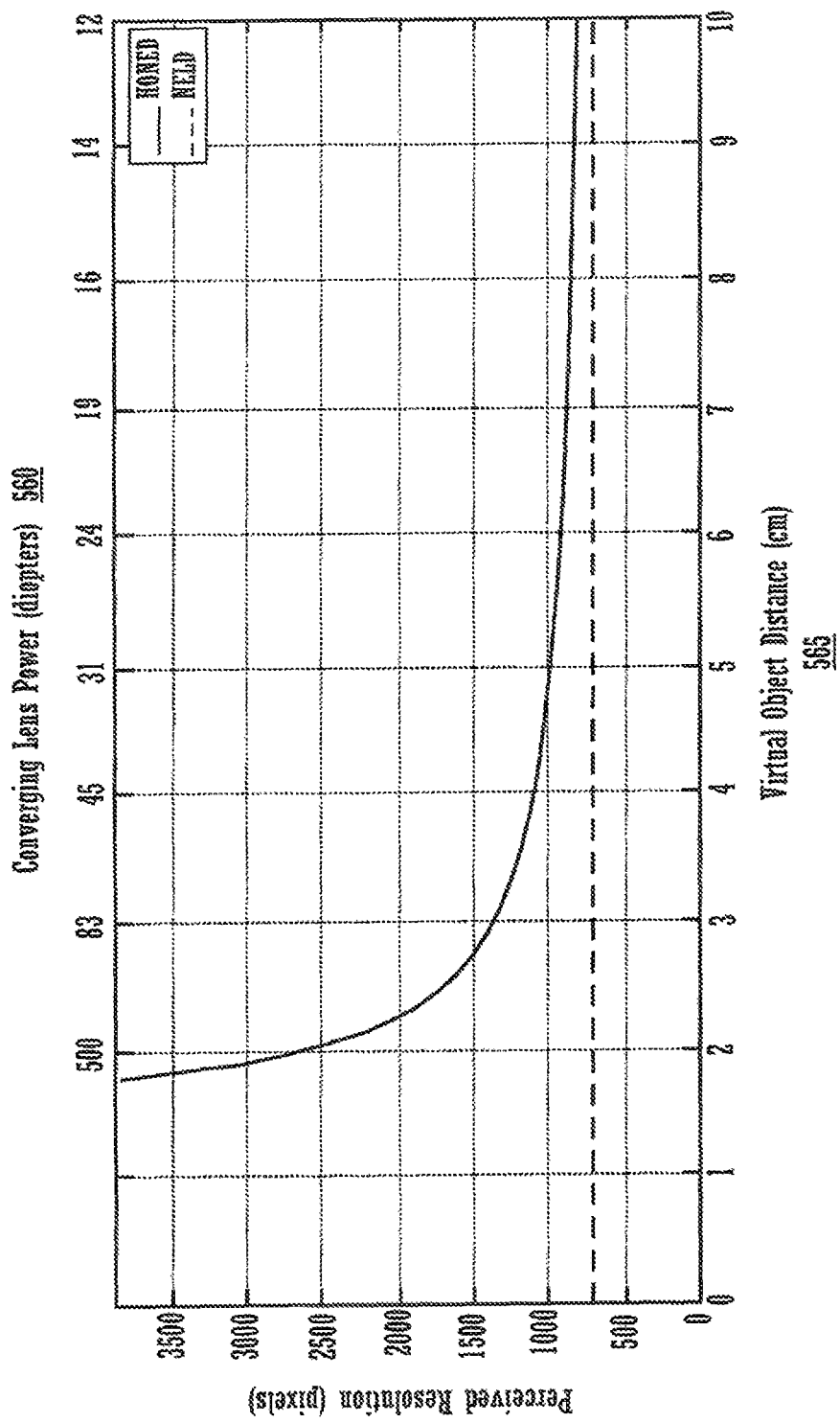
FIG. 5 illustrates the perceived resolution of the hybrid optics for near-eye display architecture plotted as a function of the virtual object distance in accordance with embodiments of the present invention.

As will be shown in conjunction with FIG. 5, a large fraction of native display resolution is preserved in the HONED architecture if the nearest virtual image distance 481 is close to eye relief 480. However, it should be noted that the nearest virtual image distance 481 must be located within the natural range for human accommodation. For example, an average 40 year old individual has a near point at 25 cm and a far point at infinity.

As discussed in detail in the NELD architecture applications, it should be appreciated that the display 390 in the NELD architecture may display an image that is recognizable or in focus only when viewed through the microlens array 330. For example, if the image produced by the display 390 is viewed without the microlens array 330, it may not be equivalent to the image perceived by the eye with the aid of the microlens array 330. The display 324 may display a pre-filtered image, corresponding to a target image to be ultimately projected, that is unrecognizable when viewed without the microlens array 330. When the pre-filtered image is viewed with the microlens array 330, the target image may be produced and recognizable. A computer system or graphics processing system may generate the pre-filtered image corresponding to the target image.

By comparison, in a HONED architecture, the nearest virtual image plane 410 is placed much closer to display 420 than in the NELD architecture. As a result the display will not be in focus when viewed through the microlens array 430. The converging lens 470 is also needed so that the nearest virtual image plane 410 can appear in focus. By reducing the depth of field and bringing the nearest virtual image plane closer to microlens array 430, the HONED architecture advantageously results in slimmer form factors and improved spatial resolution.

It should be noted that the converging lens 470 may comprise a single optical element in one embodiment. Alternatively, in other embodiments, it may employ a compound system of lenses that, while increasing the overall HMD thickness, function to minimize aberrations and increase the optical power and perceived resolution. In one embodiment, the microlens array 430 is placed in contact with the converging lens 470 in order to minimize the distance between them and, thereby, minimize the thickness of the HMD. In this embodiment, the underlying light field display will appear without significant alteration to the viewer. However, in a different embodiment, the microlens array 430 can be displaced from the converging lens 470. In this embodiment, the viewer will perceive a magnified light field display when viewing through the primary converging lens.

As discussed in the NELD architecture applications, it will be appreciated by one of ordinary skill that the NELD architectures as discussed in the NELD architecture applications and the HONED architecture of the present invention can depict more than a simple virtual image plane at a fixed distance. For example, general 3D content comprising objects extending through an allowed depth of field range can be depicted, including multiple virtual image planes at varying distances, as well as general 3D shapes, objects, textures, or other items.

FIG. 5 illustrates the perceived resolution of the hybrid optics for near-eye display architecture plotted as a function of the virtual object distance in accordance with embodiments of the present invention. It should be noted that line 520 is an exemplary plot of the perceived resolution of the HONED architecture assuming a microlens focal length of 4 mm and an eye relief of 18 mm with a 4K UHD underlying display that has a horizontal resolution of 3840 pixels. Line 530 corresponds to the upper bound on resolution for NELD designs disclosed in the NELD architecture applications (for virtual images location at optical infinity). Compared to the NELD architecture plot 530, the HONED architecture plot 520 in FIG. 5 shows that the resolution improves as the virtual image distance 565 is shortened by increasing the power of the converging lens used in the architecture. As shown along the top of FIG. 5, a change in the virtual object distance is achieved by changing the optical power of the converging lens 560. Increasing the optical power of the converging lens preserves a greater fraction of the native display resolution.

As discussed above, the HONED architecture, in one embodiment, comprises an additional converging lens in front of a microlens array. This lens introduces artificial myopia (nearsightedness) in the viewer, allowing shorter NELD-depicted virtual image distances capable of preserving a greater fraction of the native display resolution. Stated differently, the addition of a converging lens, together with the presentation of virtual NELD-depicted images at a shorter distance 481, has the effect of reducing the repetition between elemental images, e.g., elemental image 491. Accordingly, the spatial resolution perceived by the viewer is increased since fewer elements are replicated among neighboring views of the scene.

FIG. 6 is a table comprising design examples for HONED architectures. As can be seen from FIG. 6, the perceived resolution increases with increasing optical power of the additional converging lens 470 (equivalent to decreasing the focal length of the converging lens). The exemplary calculations for the values provided in FIG. 6 were performed assuming a microlens focal length of 4.0 mm, an eye relief of 18 mm and a display with a resolution of 3840×2160 pixels.

In one embodiment, the microlens focal length can also be increased to preserve a greater fraction of the native resolution of the display.

Figure 7:
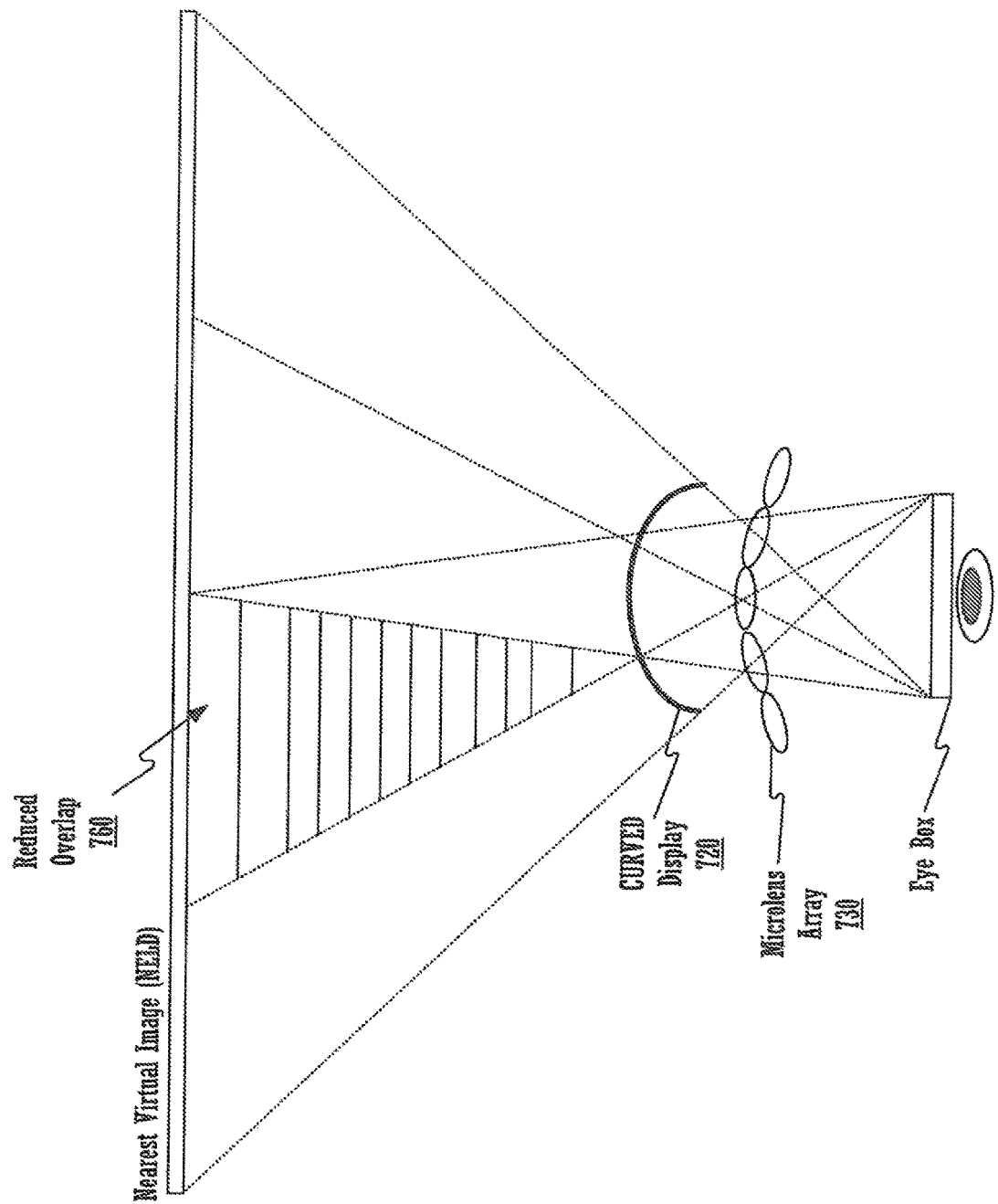
FIG. 7 illustrates the manner in which curving the microlens array in a NELD architecture increases the perceived resolution in accordance with embodiments of the present invention.

FIG. 7 illustrates the manner in which curving the microlens array in a NELD architecture increases the perceived resolution in accordance with embodiments of the present invention. As discussed above, perceived resolution can be increased by decreasing the overlap between neighboring viewing frusta. In one embodiment of the present invention, curving the microlens array 730 and the underlying display 720 preserves a larger fraction of the native display resolution. If the microlens array 730 and the underlying display 720 are curved, the frusta will diverge and lead to increasing perceived resolution. For example, overlap region 760 is significantly narrower as compared to overlap region 360 in FIG. 3.

In one embodiment, such a design would encompass prior tiled HMD architectures. Such designs can be practically implemented using multiplanar approximations to an ideal curved display, e.g., utilizing abutting planar NELD designs.

Figure 8:
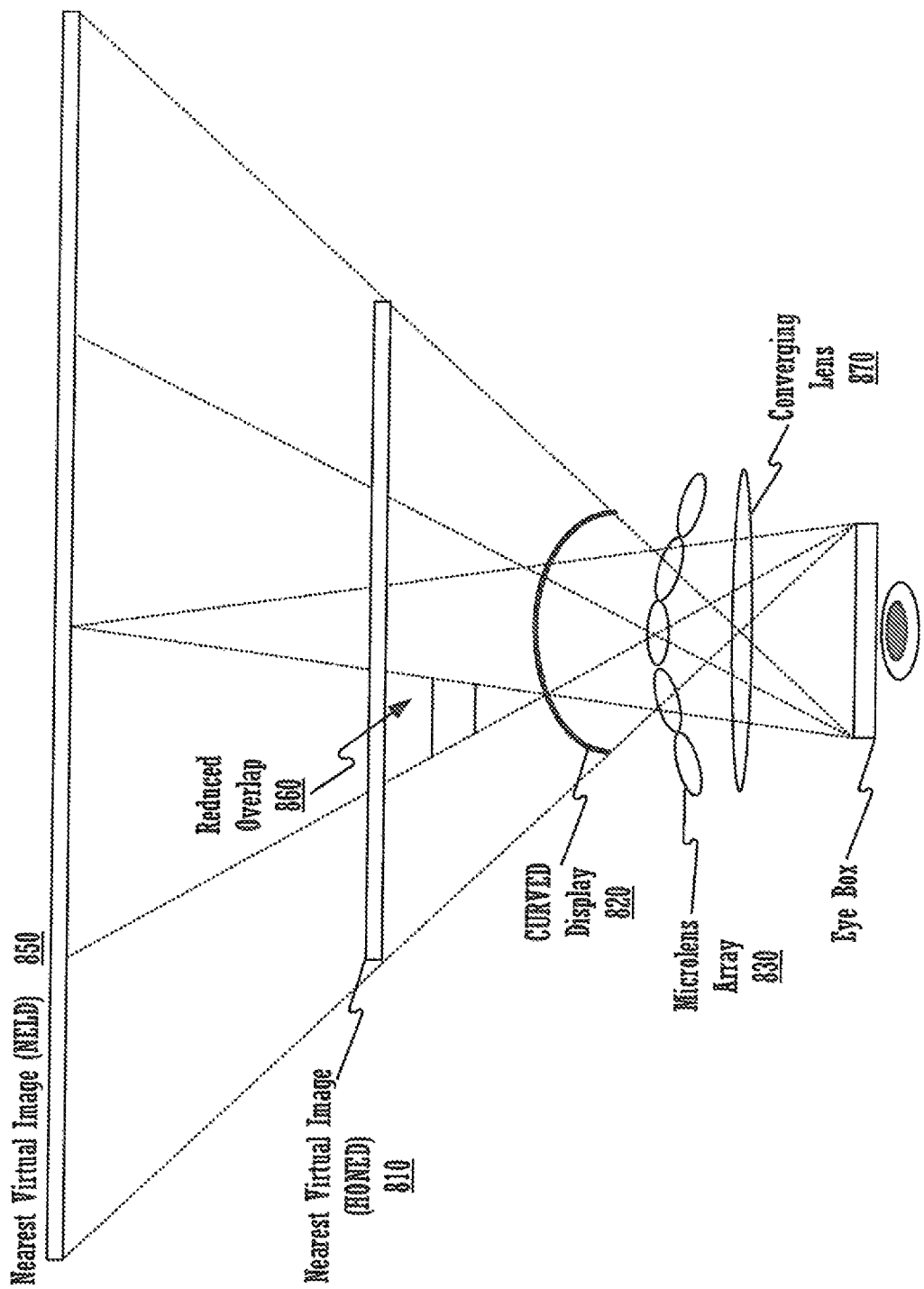
FIG. 8 illustrates the manner in which curving the microlens array in addition to using the converging lens of the hybrid optics for near-eye displays architecture increases the perceived resolution in accordance with embodiments of the present invention.

FIG. 8 illustrates the manner in which curving the microlens array in addition to using the converging lens of the hybrid optics for near-eye displays architecture increases the perceived resolution in accordance with embodiments of the present invention. As discussed above, employing converging lens 870 in front of microlens array 830 reduces the depth of field that must be depicted with the light field display as discussed above. This has the effect of bringing the nearest virtual image plane 810 closer to microlens array 830. Accordingly, the nearest virtual image under the HONED architecture 810 is significantly closer to the microlens array 830 as compared to the nearest virtual image under the NELD architecture 850. This increases perceived spatial resolution as discussed above. Further, curving the display and the microlens array leads to the frusta diverging, which also contributes to increasing the perceived resolution. As seen in FIG. 8, exemplary overlap region 860 is narrower than overlap region 460 shown in FIG. 4, which illustrates the HONED architecture without the curved display and microlens array. It should further be noted that in one embodiment, the converging lens 870 may also be curved, for example, using one or more flexible Fresnel lenses.

Figure 9A:
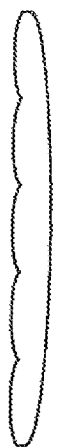
FIGS. 9A-9F illustrate the types of hybrid optics for near-eye displays that can be used in accordance with embodiments of the present invention.
Figure 9B:
Figure 9C:
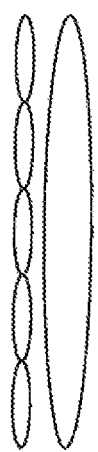

FIG. 9A-9F illustrate the types of hybrid optics for near-eye displays that can be used in accordance with embodiments of the present invention. In the embodiment of FIG. 9A, hybrid optics can be implemented using a system of double-convex lenses. In the embodiment of FIG. 9B, hybrid optics can be implemented using a system of plano-convex lenses which allows two surfaces to be flattened. In the embodiment of FIG. 9C, the air gap between a plano-convex HONED lens system can be eliminated, enabling a single-element HONED lens. In practice, the lens system can, therefore, be implemented as a single optical element with the front surface being a converging lens and the rear surface being a microlens array.

Figure 9D:
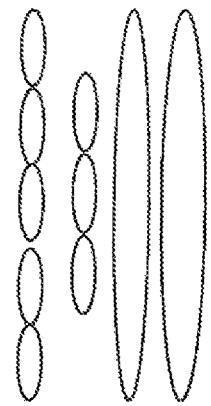
Figure 9E:
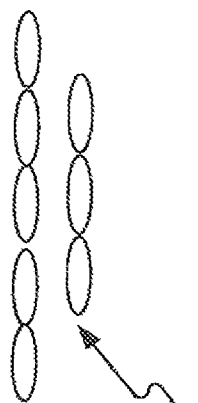
Figure 9F:
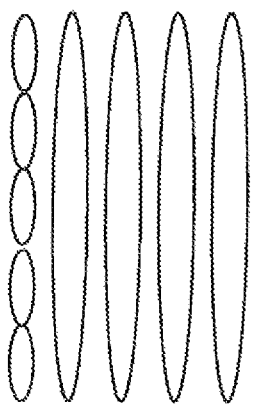

In the embodiment of FIG. 9D, the converging lens 470 can be cascaded. Instead of employing a single converging lens with a high diopter value that may be too thick, several converging lenses can be cascaded to attain the same effect. In one embodiment, the lenses employed may vary in pitch and focal length or other optical characteristics, e.g., the shape or coating of the optical surfaces. In the embodiment of FIG. 9E, a microlens array 920 can be used for the converging layer, wherein the converging layer may comprise fewer lenses than the microlens array used to generate the light field display. Furthermore, the two microlens arrays may have dissimilar optical characteristics, including microlens focal length and microlens size. And finally, in the embodiment of FIG. 9F, a combination of converging lenses and microlens arrays can be used to obtained the desired resolution, wherein the converging lenses may vary in pitch and focal length. In one embodiment, the configurations illustrated in FIGS. 9E and 9F could be extended to a plurality of microlens arrays and/or converging lenses e.g., stacks of three or more microlens arrays.

It should be appreciated that the microlenses or the microlens array 430 entirely may be electro-optically switchable such that the microlens array may be configured to be either optically equivalent to an array of microlenses or optically equivalent to a flat sheet of transparent glass. For example, the microlens array 430 may be formed by liquid crystals or by birefringent optics, together with polarizers. As a result, such switchable microlenses may be electronically controlled, alternatingly from a microlens array operable to display a light field to a transparent element appearing similar to a flat sheet of glass, operable to allow the viewing of the surrounding environment. The two modes may be rapidly alternated between, spatially-multiplexed, or combined spatially and temporally modulated. Accordingly, augmented-reality applications may be provided. Further, virtual-reality applications may be provided using a fixed microlens array.

In one embodiment, the HONED and NELD architectures illustrated in FIGS. 2B-C, 3, 4, 7 and 8 are incorporated into a HMD. The HMD would typically initially connect to a computer system so allow the firmware of the HMD to be programmed. Several features of the HONED or NELD system can be pre-programmed onto the firmware for the HMD, e.g., virtual image distance 481, dimensions of the virtual image, size of the eyebox and distance from the display etc. For example, in one embodiment, the computing system within the HMD can be programmed with a virtual depth of field, which includes all possible virtual image distances at which a viewer can comfortably accommodate, as well as the depth of field range over which the architecture, e.g., HONED, can accurately depict virtual images or general 3D scenes without obvious artifacts or distortions.

In one embodiment, a configuration file would be loaded into the HMD that comprises the properties of the display 420 including size and number of pixels on display, the microlens array 430 including the physical size and focal length of the lenses, the properties of the virtual image 410 or 450, etc. The HMD device will then display a near eye light field display consistent with the parameters in the configuration file.

In one embodiment, embodiments of the present invention may be configured to accommodate a user's eyeglass prescription. Using a near eye light field display, the system can be configured to emit light rays consistent with a virtual place located at any distance in front of the viewer. In one embodiment, the user's prescription can be programmable in the HMD. In one embodiment, the user's prescription can be a parameter in the configuration file. If a viewer is nearsighted, for example, then their accommodation range is located close to the face, e.g., from 6 cm to 25 cm. In that case, placing a virtual object anywhere in this range will allow the user to focus on it. If the nearsighted user is playing a video game that typically creates objects from 25 cm to optical infinity, then the scene can be scaled to the user's accommodation range of 6 to 25 cm. In other words, a HMD configured with either the HONED or the NELD system may be programmed with the user's prescription—the near eye light field display in either architecture would then emit rays consistent with the objects in the scaled depth range.

Furthermore, in one embodiment, the HONED or NELD architectures can be used to iteratively assess the viewer's optical prescription, in one or both eyes, using a series of presented images, together with prerecorded dialogue and instructions. For example, the user can press one of two buttons to move the perceived virtual image plane closer or further away. When a comfortable distance is reached, the system will be able to estimate the viewers' optical prescription, thereby, eliminating the need to know these parameters ahead of time. In one embodiment, however, the prescription can be automatically determined by the HMD computer system without interactive participation by the user.

Figure 10:
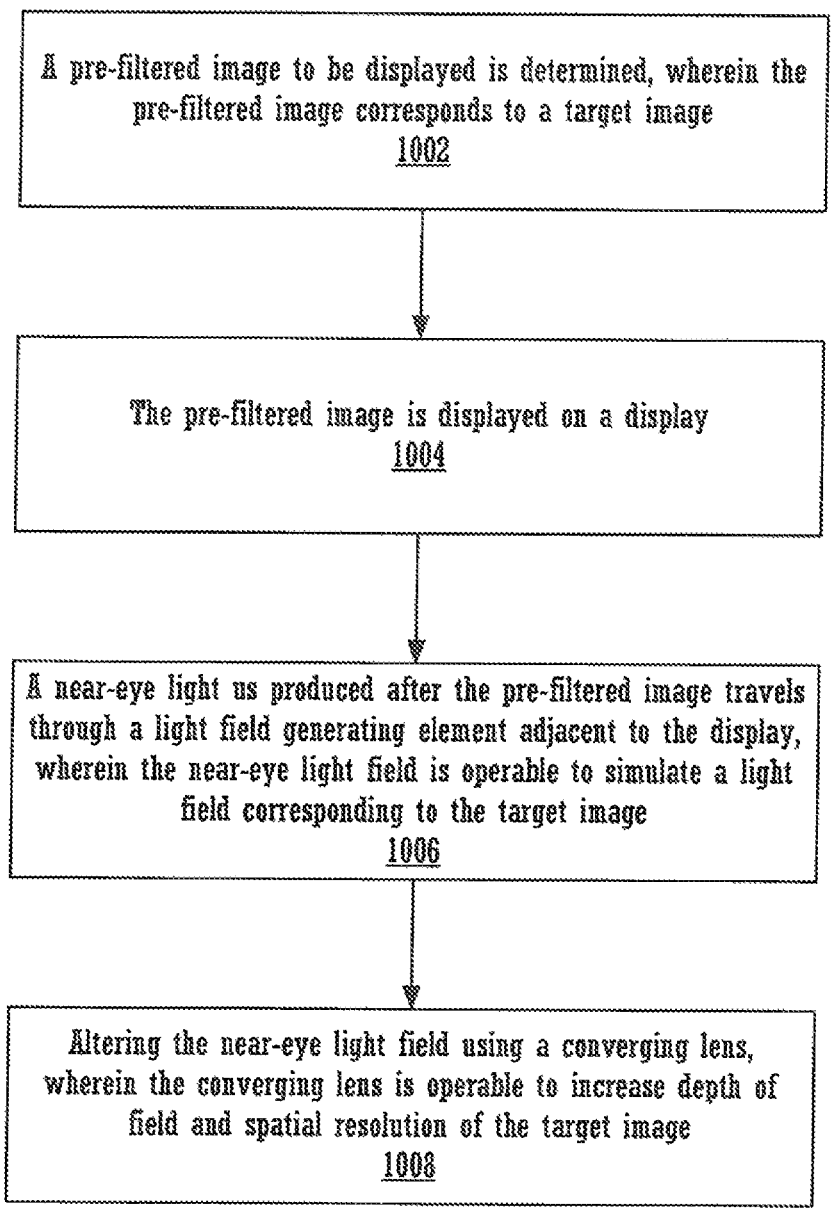
FIG. 10 shows a flowchart of an exemplary computer-implemented process of displaying a NELD image with increased spatial resolution in accordance with embodiments of the present invention.

FIG. 10 shows a flowchart 1000 of an exemplary computer-implemented process of displaying a near-eye light field display (NELD) image with increased spatial resolution in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 10 should not be construed as limiting the scope of the invention. Rather, it will be apparent to persons skilled in the relevant art(s) from the teachings provided herein that other functional flows are within the scope and spirit of the present invention. Flowchart 1000 may be described with continued reference to exemplary embodiments described above, though the method is not limited to those embodiments.

In a block 1002, using a pre-filtering procedure and the parameters in the configuration file programmed into the HMD from a computing device, a pre-filtered image to be displayed is determined, wherein the pre-filtered image corresponds to a target image. For example, a computer system may determine a pre-filtered image that may be blurry when viewed by itself in an accommodation range but in focus when viewed through a filter or light field generating element. The pre-filtering procedure is a perspective rendering procedure that renders the pixels from a virtual image plane, e.g., image plane 410 onto a display. In other words, the pre-filtering procedure may be a perspective projection of the pixels onto the display 420, where the projection is performed separately for each elemental image, e.g., elemental image 491, corresponding to the viewing frusta defined by the eyebox 440 and the respective microlens of microlens array 430.

In a block 1004, the pre-filtered image is displayed on a display. For example, in FIGS. 3, 4, 7 and 8 a pre-filtered image is displayed on the display 390, 420, 720 and 820 respectively. The displaying step can comprise using the projected data to transfer pixel values from the computing device to the display 420. Further, it can comprise illuminating the pixels with the computed values.

In a block 1006, a near-eye light field is produced after the pre-filtered image travels through a light field generating element adjacent to the display, wherein the near-eye light field is operable to simulate a light field corresponding to the target image. For example, in FIG. 4, a light field corresponding to a target image is produced after the pre-filtered image passes through the microlens array 430.

Finally, in a block 1008, the near-eye light field is altered using a converging lens 470, wherein the alteration acts to increase a depth of field that is depicted with the light field to allow the user to focus on the perceived image easily. Also the alteration of the near-eye light field by the converging lens allows for increased spatial resolution of the target image.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for displaying a near-eye light field display (NELD) image comprising:
   displaying an image on a display, wherein said image corresponds to a target image;
   producing a near-eye light field array after said image travels through a microlens array disposed adjacent to said display and comprising a plurality of microlenses, wherein said near-eye light field array simulates a field corresponding to said target image, wherein said display and said microlens array are disposed within a near-eye range of a user; and
   altering said near-eye light field array using at least one converging lens, wherein said altering allows said user to focus on said target image at an increased depth of field at an increased distance from an eye of said user.

2. The method of claim 1, wherein said image is a pre-filtered image, and further comprising:
determining said pre-filtered image to be displayed.

3. The method of claim 1, wherein at least one of said display, said converging lens, and said microlens array are curved in order to increase said perceived spatial resolution.

4. The method of claim 1, wherein said at least one converging lens is disposed between said microlens array and an expected position of an eye of said user and further is selected from the group consisting of: a double convex lens, a plano-convex lens, a single optical element with a front surface being a converging lens and a rear surface being a microlens array, a cascade of converging lenses with varying focal lengths and pitches, and a cascade of microlens arrays.

5. The method of claim 1, wherein at least one of said plurality of microlenses are electro-optically switchable.

6. The method of claim 1, wherein said determining is executed by a computer system, and further wherein said computer system is operable to be programmed with a virtual depth of field.

7. A method for displaying a near-eye light field display (NELD) image comprising:
determining a pre-filtered image to be displayed, wherein said pre-filtered image corresponds to a target image;
displaying said pre-filtered image on a display;
producing a near-eye light field array after said pre-filtered image travels through a light field generating element, wherein said near-eye light field array simulates a field corresponding to said target image, wherein said display and said light field generating element are disposed within a near-eye range of a user; and
altering said near-eye light field array using at least one converging lens, wherein said altering allows said user to focus on said target image at an increased depth of field at an increased distance from an eye of said user and to increase spatial resolution of said target image.

8. The method of claim 7, wherein said light field generating element is a microlens array disposed adjacent to said display.

9. The method of claim 7, wherein said light field generating element is a stack of displays.

* * * * *